United States Patent [19]

Wirth et al.

[11] Patent Number: 5,270,859
[45] Date of Patent: Dec. 14, 1993

[54] OPTICAL INSTRUMENT WITH MICRO-LENSES

[75] Inventors: Allan Wirth, Bedford; Andrew J. Jankevics, Acton; Dante P. D'Amato, Swampscott; Theresa L. Bruno, Bedford; Lawrence E. Schmutz, Watertown; Franklin M. Landers, Wakefield, all of Mass.

[73] Assignee: United Technologies Corporation, Hartford, Conn.

[21] Appl. No.: 828,268

[22] Filed: Jan. 30, 1992

[51] Int. Cl.$^5$ .................. G02B 27/10; G02B 23/00
[52] U.S. Cl. .................. 359/622; 359/435; 359/419; 359/422; 359/744
[58] Field of Search ........... 359/622, 621, 619, 435, 359/434, 419, 422, 744

[56] References Cited

U.S. PATENT DOCUMENTS

| | | | |
|---|---|---|---|
| 2,139,855 | 12/1938 | Saint Genies | 359/622 |
| 3,655,284 | 4/1972 | Agliata | 359/622 |
| 3,657,981 | 4/1972 | Benton | 359/736 |
| 4,168,900 | 9/1979 | Adachi | 359/619 |
| 4,448,499 | 5/1984 | Tokumura | 359/619 |

FOREIGN PATENT DOCUMENTS

| | | | |
|---|---|---|---|
| 66414 | 4/1982 | Japan | 359/619 |
| 21456 | 9/1909 | United Kingdom | 359/619 |

OTHER PUBLICATIONS

Keisuke Araki, "Compound Eye Systems for Non-Unity Magnification Projection" Applied Optics, vol. 29, No. 28, Oct. 1, 1990.

*Primary Examiner*—Jon W. Henry
*Attorney, Agent, or Firm*—McCormick, Paulding & Huber

[57] ABSTRACT

A variety of optical systems can be formed from select configurations of micro-optic multiplets (MOM) comprised of two or more microlens modules (MLM). The MLMs themselves are formed from planar arrays of microlenses. An optical system configured in accordance with the present invention forms a single primary image, together with a set of images transversely displaced from an optic axis and is characterized by the property that the image distance and the object distance move in the same direction, in stark contrast to known lens systems. For example, when an object distance decreases, the corresponding image distance also decreases with the present optical system.

4 Claims, 6 Drawing Sheets

OPTICAL INSTRUMENT WITH MICRO-LENSES

TECHNICAL FIELD

The field of the invention is that of optical micro-lenses, in particular, combinations of arrays of micro-lenses.

CROSS-REFERENCE TO RELATED APPLICATION

Some of the subject matter hereof may be disclosed and/or claimed in the following commonly owned, copending U.S. Pat. application No. 07/8267,794 which is incorporated herein by reference: "A Micro-Lens Panoramic Imager".

BACKGROUND OF THE INVENTION

Arrays of small lenses having a diameter on the order of one millimeter are referred to as micro-lenses and have been made in a number of ways and used for a variety of purposes. An array of micro-lenses has been matched to an array of pixels on a television screen or other raster imaging device. Another use, such as that illustrated in "Agile Beam Steering Using Binary Optics Microlens Arrays", by W. Goltsos and M. Holz, Optical Engineering Vol. 29 No. 11, page 1392, is for steering a collimated beam of monochromatic radiation through an angle by translating one of a pair of binary micro-lens arrays that combine to form an array of Galilean telescopes. The beam is required to be monochromatic because binary microlenses are highly dispersive. It would be advantageous to utilize pairs of microlens arrays for imaging or with broadband radiation. The present optical instrument is drawn towards such an invention.

SUMMARY OF THE INVENTION

An object of the present invention is to provide an optical instrument having an optical processor referred to as a micro-optic multiplet (MOM) that includes two or more micro-lens modules (MLM) optically matched a specific fashion with specifically related parameters.

Another object of the present invention is the use of one positive and one negative micro-lens module, that combine to form an image.

Still another object of the present invention is to provide an optical instrument of the forgoing type that has a pair of positive micro-lens modules having different lenslet pitch that cooperate to focus incoming radiation.

Another object of the present invention is to provide an optical instrument of the forgoing type that includes a triplet of micro-lens modules in which an intermediate micro-lens module serves to image a first array plane on a second array plane.

Yet another object of the present invention is to provide an optical instrument of the foregoing type that employs two pairs of micro-lens modules for the purpose of mixing the amplitude or phase distribution of an incoming optical beam.

Another object of the present invention is to provide an optical instrument of the forgoing type in which a plurality of micro-lens modules provide variable magnification (i.e. zoom).

Other features and advantages will be apparent from the specification and claims and from the accompanying drawings which illustrate an embodiment of the invention.

According to the present invention, an optical system for processing incident radiation emitted from a source includes a first lenslet array having a first focal length, a first pitch, and a first lens diameter, positioned at a first longitudinal distance along an optic axis to intercept the incident radiation and a second lenslet array having a second focal length, second pitch, and a second lens diameter, positioned at a second longitudinal distance along the optic axis to intercept radiation emerging from the first lenslet array. The second lenslet array is separate along the optic axis from the first lenslet array by a predetermined amount such that the incident radiation is focused by the combined action of a plurality of pairs of corresponding lenslets from the first and second lenslet arrays to an overlap image in an overlap plane transverse to the optic axis and to a set of off-axis secondary images located at a set of transverse positions displaced from the optic axis.

DESCRIPTION OF THE PREFERRED EMBODIMENT

Figure 1:
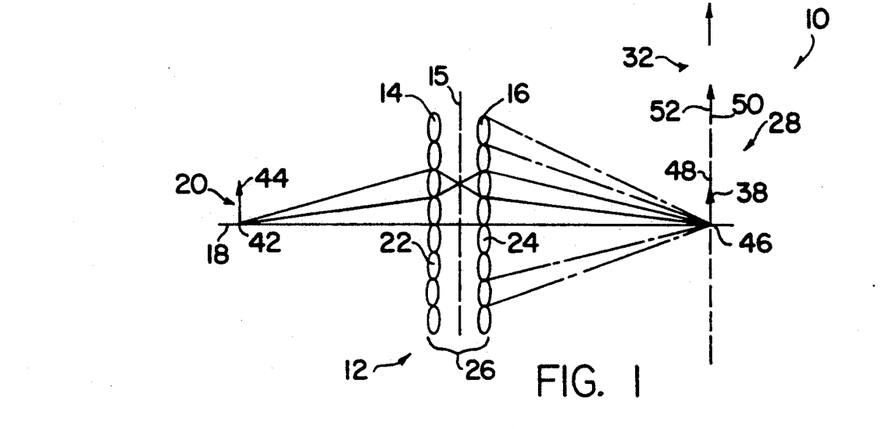
FIG. 1 illustrates the parameters of an optical system provided according to the present invention having a micro-optic multiplet (MOM).

Referring now to FIG. 1, there is illustrated an optical system 10 including a generalized micro-optic multiplet 12 (MOM), which comprises a set of at least two modules 14, 16 (MLM) of microlenses. These MLM are made from known materials such as optical epoxy, glass or zinc selenide. An axis 18 extends from left to right in the drawing and an object 20 (here, an arrow) is positioned on the axis a distance S from module 14, th leftmost module in the pair. MLM 14 has microlenses 22 of diameter $d_1$ and focal length $f_l$. MLM 16 is comprised of microlenses 24 of diameter $d_2$ and lens focal length $f_2$. Alternatively, the micro-lenses are referred to as lenslets. MLM 14 is spaced apart from MLM 16 along the axis by a distance $h_1+h_2$, denoted by reference numeral 26. MLM 14 is spaced from an intermediate image plane 15 by a distance $h_1$. Similarly, MLM 16 is spaced from the intermediate image plane by $h_2$. An array of images 28 comprising a central image 30 located on the axis and spurious images 32 is positioned an image distance C from MLM 16. The conditions required to form an image will be explained in detail below.

A MOM does not have an optic axis in the same sense that a conventional lens does. For purposes of forming an image, the optic axis will be taken to be a perpendicular drawn from the image to the MOM. The term primary image will be used for the image that is formed at the axis or is closest to the axis. When the two MLMs in MOM 12 are aligned so that the axis is at the edge of a lenslet in both arrays or is at the center of a lenslet in both arrays, the primary image will be on the axis 18. When the perpendicular does not meet this condition, the primary image will be displaced from the axis. This will be the case where a scene has more than one object. This is not a problem, since most objects have a finite size and many optical systems (e.g., cameras) are not aligned carefully. For a collimated beam, the axis of the beam will be taken as the optic axis.

MOMs also behave very differently from pairs of conventional glass lenses. A relationship corresponding to the Gaussian image equation formula is given by the following equation:

$$1/C = Q/R \ (1/S + 1/F_{\text{eff}}) \quad (1)$$

In this equation, C is the distance from the right hand lens array to the image, S is the distance from the object to the first lens array, Q is the ratio $f_1$ divided by $f_2$, R is the ratio $d_1$ divided by $d_2$, and $F_{\text{eff}}$ is the effective focal length of the array. The effective focal length is defined as the distance between a microlens module and the focus of an input collimated beam. It may be either positive or negative and can be derived as follows.

First, the position of an overlap or focal plane can be found. The two MLMs are, as noted above, configured with lenslet focal lengths $f_1$ and $f_2$, lens diameters $d_1$ and $d_2$, separation $h_1 + h_2$ (where $h_1$ and $h_2$ are the distances from the intermediate image plane to lenslets 1 and 2 respectively) as shown in FIG. 1. The ray from an object at distance S from the first MLM 14 that passes through the center of the $n^{th}$ lenslet above the axis 18 in the MLM 14 crosses the intermediate image plane at a height $$\frac{nd_1}{S} \cdot h_1 + nd_1. \quad (2)$$

This is the height of the intermediate image formed by the nth lenslet in MLM 14. Now the optic axis of the $n^{th}$ lenslet in the MLM 16 is at a height of $nd_2$ above the axis. Thus the $n^{th}$ intermediate image lies at a distance $$\left(\frac{nd_1}{S} \cdot h_1 + nd_1\right) \cdot nd_2 \quad (3)$$

from the optical axis of the $n^{th}$ lenslet in the second array. The ray that passes from this image can be constructed through the center of the $n^{th}$ lenslet in the MLM 16 and on to cross the axis of the system as defined by the object position. By similar triangles, the distance from the MLM 16 to point where this ray crosses the axis, C, is related to the other quantities by $$\frac{nd_2}{C} = \frac{\left(\frac{nd_1}{S} \cdot h_1 + nd_1\right) \cdot nd_2}{h_2} \quad (4)$$

The parameter n drops out of this equation, meaning the rays from each pair of lenslets will cross the axis at the same point. If it is further required that each pair of lenslets relay an image of the object to that distance (C) we will have formed a single pair. The requirement that the lens pairs relay an image to the overlap point may be stated via the following relationships for the distances to the intermediate plane, $h_1$ and $h_2$.

$$h_1 = \frac{Sf_1}{S - f_1}, \ h_2 = \frac{Cf_2}{C - f_2} \quad (5)$$

If these quantities are now substituted into equation 4 and the result is solved for C it is found:

$$C = f_2 \left( \frac{1}{\frac{d_1}{d_2}\left(1 + \frac{f_1}{S - f_1}\right) - 1} + 1 \right) \quad (6)$$

In order to make this relation easier to use it is convenient to define a quantity that is equivalent to the effective focal length of a conventional lens. To do this it is necessary to determine the transverse magnification ratio of the system, since the distance to image plane does not uniquely set the magnification or the effective focal length. The magnification of the first image link is $h_1/S$ and from the intermediate image to the final image it is $C/h_2$. The overall magnification is thus $(h_1 C)/(h_2 S)$ or $$\frac{f_1(C - f_2)}{f_2(S - f_1)} \quad (7)$$

when $h_1$ and $h_2$ are substituted. The parameter C can be replaced in the expression above with equation 6 to yield:

$$M_t = \frac{f_1}{S - f_1} \left( \frac{1}{\frac{d_1}{d_2}\left(1 + \frac{f_1}{S - f_1}\right) - 1} \right) \quad (8)$$

The effective focal length can then be defined. If the input beam from infinity is deviated by an angle $\alpha$ the image will move a distance a from the axis. The effective focal length is then a $\alpha$. When the beam moves through angle $\alpha$ the intermediate image moves $\alpha \ n_1$. It follows that the final image moves by an amount $\alpha \ h_1 \ Cs/h_2$ (which is also the quantity a), where Cs is the image position for $S = \tilde{s}$. From equation 4 we see that $$C_\infty = f_2 \frac{R}{R - 1}, \ \text{where } R = \frac{d_1}{d_2} \quad (9)$$

The effective focal length is:

$$F_{eff} = a/\alpha = \frac{h_1}{h_2} C_\infty = \frac{f_1(C_\infty - f_2)}{f_2 C_\infty} C_\infty \quad (10)$$

where for S=s, $h_1 = f_1$. This relationship immediately simplifies to:

$$F_{eff} = \frac{f_1 f_2}{f_2(R-1)} = \frac{f_1}{R-1} \quad (11)$$

Equation 6 can be rewritten as:

$$C = f_2 \left( \frac{\frac{d_1}{d_2}\left(1 + \frac{f_1}{S - f_1}\right)}{\frac{d_1}{d_2}\left(1 + \frac{f_1}{S - f_1}\right) - 1} \right) \quad (12)$$

Inverting, simplifying fractions and substituting R for $d_1/d_2$ results in:

$$\frac{1}{C} = \frac{1(RS - (S - f_1))}{f_2 RS} \quad (13)$$

The quantity $f_1/R - 1$ can be replaced with $f_{eff}$ $$\frac{1}{C} = \frac{f_1}{f_2} \frac{1}{R}\left(\frac{1}{S} + \frac{1}{f_{eff}}\right) \text{ or} \quad (14)$$

$$\frac{1}{C} = \frac{Q}{R}\left(\frac{1}{S} + \frac{1}{f_{eff}}\right) \text{ where } Q = \frac{f_1}{f_2}$$

Which is equation 1, above.

Those skilled in the art will immediately appreciate that the minus sign in this equation results in properties very different from that of the Gaussian image equation as given by equation 15:

$$1/i = 1/f + 1/o \quad (15)$$

where o is the object distance to a lens (O is positive for an object to the left of a lens with light travelling from left to right), i is the image distance to the lens (i is positive for an image to the right of the lens with light travelling from left to right) and f is the focal length of the lens.

Figure 2:
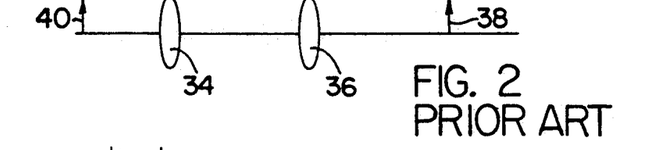
FIG. 2 illustrates a parameters of a pair of ordinary lenses.

In the classic lens maker's formula, when the object distance is increased, the image distance is decreased; i.e., the two distances move in opposite directions. One skilled in the art can see by inspection of FIG. 2 that lenses 34 and 36 form an image 38 from an object 40. As the location of the image approaches lens 34, the position of the object will move away from lens 36. Those skilled in the art will readily appreciate that the image distance and the object distance move in the same absolute direction for MOMs. Therefore, when the object distance decreases, the image distance also decreases.

MOM 12 may be characterized by 5 parameters relating to the properties of micro-lenses: $f_1$, $f_2$, $d_1$, $d_2$, and the spacing $h_1 + h_2$. A corresponding set of global parameters may be defined from these local parameters: C (image distance), S (object distance), Mt (transverse magnification), Spn (spurious image spacing), and $F_{eff}$ (effective focal length). It is apparent to those skilled in the art that there is a five-dimensional "parameter space" that permits flexibility in design with the present invention that was previously unknown in the art.

The behavior of a MOM with MLMs whose lenslets of different respective pitch may be understood as follows. Consider the set of rays from an object at infinity that strike a MLM. The particular rays that pass through the center of the lenslets of that MLM are not deviated thereby. If a second lens MLM of identical pitch is now placed in the beam and the centers of the lenslets aligned with the centers of the lenslets of the first MLM, it too will have no effect on the rays. If, however, the second MLM is displaced slightly, each ray will then be deviated through some angle determined by the displacement of the two MLMs. This is the basic concept behind lens array scanners.

Rather than displacing the second MLM, it is possible to change the spacing of the lenslets thereof. When the rays progressively further off of the lenslet axis are considered, the rays from the centers of the first MLM's lenslets pass through the second MLM's lenslets at progressively increasing distances. As a result, they are deviated through progressively increasing angles. If the second MLM's lenslets are closer together, the rays strike further and further outside the lenslets centers and are deviated more and more in the direction of the lens centers. Since the angle of deviation depends linearly on the distance from the axis of alignment, these rays all cross that axis and each other at one point. This point defines the overlap plane of the MOM.

If the second MLM's pitch is greater than that of the first, then the deviation of the rays is in the opposite sense. If these diverging rays are traced back they define a virtual overlap plane in front of the MOM.

The differential pitch of the two arrays thus leads to a global optical power for the MOM. This converging or diverging power is superimposed on the imaging properties of each lenslet pair.

Returning to FIG. 1, an effective focal length ($F_{eff}$) of one or a combination of two of the MOMs may be thought of as the position of a real image or virtual image produced by a collimated beam traversing the MOM. The formula for this effective focal length is given by equation 11. Note that this equation does not depend on $f_1$ and that when the pitch of the two MLMs is equal, $F_{eff}$ is infinite; i.e. the output beam is collimated. As used herein, "pitch" is defined as the number of lenslets per unit length of a MLM. Thus for MOMs that have equal pitch, it is possible to form an image only in the special case of a 1:1 MLM relay in which $f_1 = f_2$ and $d_1 = d_2$. In the case of a single MLM, this formula does not apply and the effective focal length of the MLM is equal to the focal length of the lenslets in the array. Note that parameters and quantities analogous to those used in classical optics are presented herein. However, these quantities are not, in general, the same as their classical counterparts and may be derived using assumptions that differ.

The transverse magnification, or the ratio of image to object size, for an MOM having a spacing not equal to $f_1 + f_2$ is given by equation 8 and is repeated below as equation 16:

$$M_t = \frac{f_1}{(S - f_1)\left[R\left[1 + \frac{f_1}{S - F_1}\right] - 1\right]} \quad (16)$$

This formula does not depend on $f_2$ or on the image distance, in sharp contrast to the classical result. Thus, a desired magnification can be achieved with two parameters remaining free for variation.

A variable-focus camera or other optical system may be constructed in accordance with the present invention. Note that only $f_1$ and R appear in the magnification equation 4, so that the focus may be adjusted by varying C for a fixed distance between the last MLM and an overlap plane. The magnification may be set by selecting R and $f_2$ is still a free parameter.

A condition for a "clean" image is that spurious images be separated clearly from the main image. The transverse separation of images for the present MOM for an object at infinity is $d_1/(R-1)$. The start of the first spurious image is also the point where $nd_1 = md_2$ equals an integer (for integers n and m). It is convenient to express the separation in angular terms. From the relationship of $C_s$ and $f_{eff}$ seen in equation 9 and 11 the angular magnification of an object at infinity is Q/R. The angular separation of images is thus:

$$[d_1/(R-1)]/C = [d_1/(R-1)]/F_{eff} = d_1/f_1. \quad (17)$$

For pairs of positive MLMs there is a set of images of the same point in object space; i.e. there is a one to many mapping of object space to image space. As a point moves away from the optic axis (axis 18, FIG. 1), a limiting angle is reached beyond which the primary image of the point overlaps the first spurious image of an axial point. Consequently, there is an unambiguous angular range defined as the angular range in object space that maps to an angular range in image space having an upper bound equal to the initial angle subtended by the first spurious image.

In FIG. 1, point 42 is the bottom of object arrow 20 and point 44 is the tip, with corresponding points 46 and 48 in image space. As point 44 moves away from the optic axis (toward the page top in FIG. 1), it will eventually overlap point 50, the bottom of the first spurious image 52. In the case of a triplet MOM with a field lens of conventional design (not shown) located between two MLMs, the image separation and the unambiguous angular range are twice that given above because the field lens suppresses the odd spurious images. A field lens in this context refers to a lens positioned at the image between the MLMs. As such, the field lens does not alter the parameters of the optical instrument shown in FIG. 1, but rather redirects light where it is desired. Alternatively, image separation can be expressed as that position where the distance from the axis to the first spurious image ($Sp_1 = d_1/(R-1)$) is greater than the size of the primary image.

The calculations set forth above are for a spacing, $h_1 + h_2$, such that the images at axis 18 from all of the lenslet pairs are in focus at the same distance along that axis. For a given image and object distance, the spacing, $h_1 + h_2$, required for a focus is given by:

$$h_1 + h_2 = \frac{CS(f_1 + f_2) - (f_1 f_2)(S + C)}{(S - f_1)(C - f_2)} \quad (18)$$

The present invention also contemplates an optical system in which the spacing is fixed between the MLMs and the image distance moves. In the optical system 54 of FIG. 3, the images from the different lenslet pairs will not be in focus at the same axial distance. On the right of FIG. 3 there is plane 56, referred to as the overlap plane, in which the image from the $n^{th}$ lenslet pair crosses axis 58. Planes 60 and 62 illustrate image positions 64 and 66 for which the image is in focus and therefore constitute focal planes.

For a given image and object distance, the spacing $h_1 + h_2$ required for a focus is given by equation 18, while the axial position of the focal plane is given by:

$$\text{Focal Plane dist} = \frac{f_2[(S - f_1)(h_1 + h_2) - S \cdot f_1]}{[(S - f_1)(h_1 + h_2 - f_2) - S \cdot f_1]} \quad (19)$$

The separation of the focal planes from the overlap plane is related to the quality of the image and may be obtained by subtracting equations 18 and 19. The axial position of the overlap plane is given by equation 1.

The focal plane for an individual lenslet pair moves in toward the optical system as the object moves out, which implies that the focal distance is inside the overlap plane for objects further from the MOM than the optimal distance. The deviation of the radiation from a lenslet pair at the overlap image plane from the focus at the focal plane of that lenslet pair depends approximately on d/f (lenslet diameter divided by lenslet focal length) and the overlap image quality depends approximately on $D/F_{eff}$, where D is the effective aperture of those lenslet pairs contributing to the overlay image. In a particular example, for an optical instrument having a MOM with characteristics like an $f_2$ camera lens the focal length ($f_1$) of the lenslets in the first and second eMLMs is 5 and 2 mm, respectively. The lenslet diameters in the first and second MLMs are 2 and 1.8 mm, respectively. The MLM separation ($h_1 + h_2$) is 7.23 mm while C is 20 mm. These parameters yield an effective focal length of 45 mm. An image at infinity is focused at 20 mm.

The individual lenslet pairs in lenslet arrays formed according to the invention have a depth of focus that is very large and thus the overlapping of slightly out-of-focus images at the axial distance where the out-of-focus images cross the axis combine to define an area in which the optical intensity is much greater than the large spread of all the in-focus images. For example, a photographic paper at the overlap plane will record a single, clear image with relatively low background intensity. The intensity at the overlap plane will be approximately $n^2$ times the intensity at each of the individual images in the focal plane, where n is the linear number of lenslets contributing to the image (intensity at focal distance). For convenience in nomenclature, the "image" at the axis that is formed by the superposition of the slightly out of focus images is referred to as the overlap image.

Figure 3:
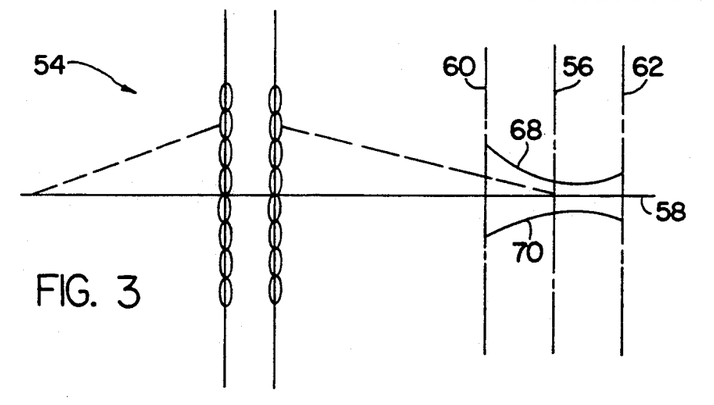
FIG. 3 illustrates the relationship of a focus and a set of overlapping images for the optical system of FIG. 1.

In FIG. 3, the relationship between the plane of focus and the plane of overlap for the $n^{th}$ lenslet pair from the axis can be seen. The radiation from a point on the object will converge to a region bounded by curved lines 68, 70 extending between the focal planes. The "nominal" focal plane corresponds to the overlap plane, while the focal planes 54, 56 mark the axial distances where the blurring due to lack of overlap equals the diffraction blur spot of a single lens pair. The distance between these two planes will be taken to be the analog of the depth of focus for conventional lenses.

In order to calculate the depth of field, it is helpful to define an effective F-number, analogous to that for conventional lenses:

$$f\#_{eff} = C/2nd_2 \quad (20)$$

where n is the number of lenslets above (or below) the optic axis, C is as before, and $d_2$ is the diameter of the lenslets in the second MLM. The blur spot formed by a single lenslet pair is approximately:

$$\text{Blur spot} = \lambda \cdot f\# \text{ of lenslet} = \lambda \cdot d_2 C \quad (21)$$

Using the criterion of diffraction blur spot being signed to overlap Blur and Substituting the $f_{eff}$ of the whole array yields:

$$DoF = \text{spot size} \cdot f\#_{eff} = 2n\lambda(f\#_{eff})^2 \quad (22)$$

Those skilled in the art will appreciate that the Strehl ratio or other figure of merit of concentration of energy in the overlap image for a given distance of the overlap plane (i.e. nominal focal plane) will decline at small lenslet diameters because of diffraction effects and will also decline at large lenslet diameters because of aberrations in the lenslets. There will therefore be some lenslet diameter that will produce an optimum concentration of energy in the overlap plane.

Figure 4:
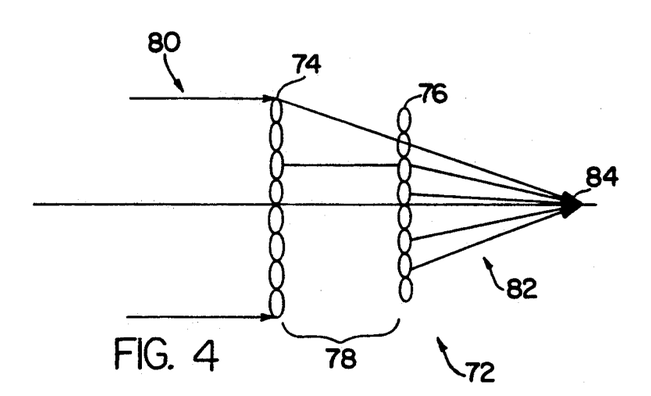
FIG. 4 illustrates an optical system comprising a micro-optic multiplet whose two micro-lens modules have different pitch.

Referring now to FIG. 4, there is shown an optical system 72 comprised of a pair of positive (i.e., converging) MLMs 74, 76. When the spacing 78 between the two positive MLM arrays is the sum of the focal lengths of the individual lenslets, a collimated input beam 80 will provide a collimated output beam 82. In the particular case where the pitches of the MLMs are different, there is a focus effect as illustrated in FIG. 4. The diameter of the lenslets in MLM 76 is smaller than that of the lenslets in MLM 74, providing a focus of the output beam to beam spot 84.

For pairs of positive MLMs, a single point in the object space will map into a number of points in the image space corresponding to the primary image plus the spurious images. An equation for this axial position of the beam spot is given as:

$$C = \frac{f_2}{R - 1} \quad (23)$$

Figure 5:
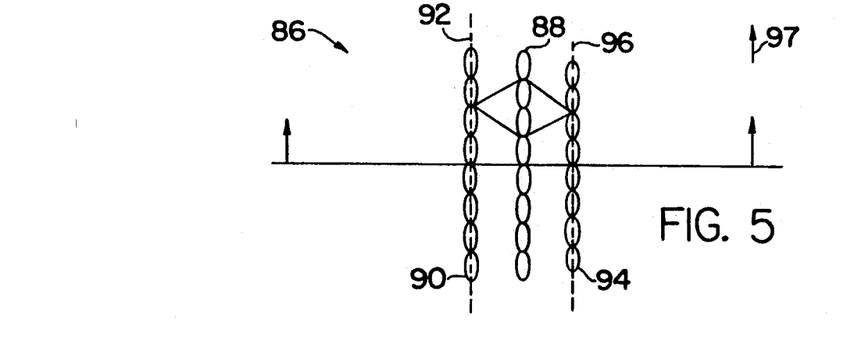
FIG. 5 illustrates still another optical system having a triplet of micro-lens modules for suppressing spurious images.

In FIG. 5, there is illustrated an other optical system 86 provided according to the present invention in which first order spurious images as illustrated in FIG. 1 are suppressed by the addition of a third MLM 88 that serves as a field lens. MLM 88 images light from input MLM 90 lieing in plane 92 onto output MLM 94 lieing in plane 96. The result is that every other spurious image is suppressed, so that the first visible spurious image 97 will be in the second order.

Figure 6:
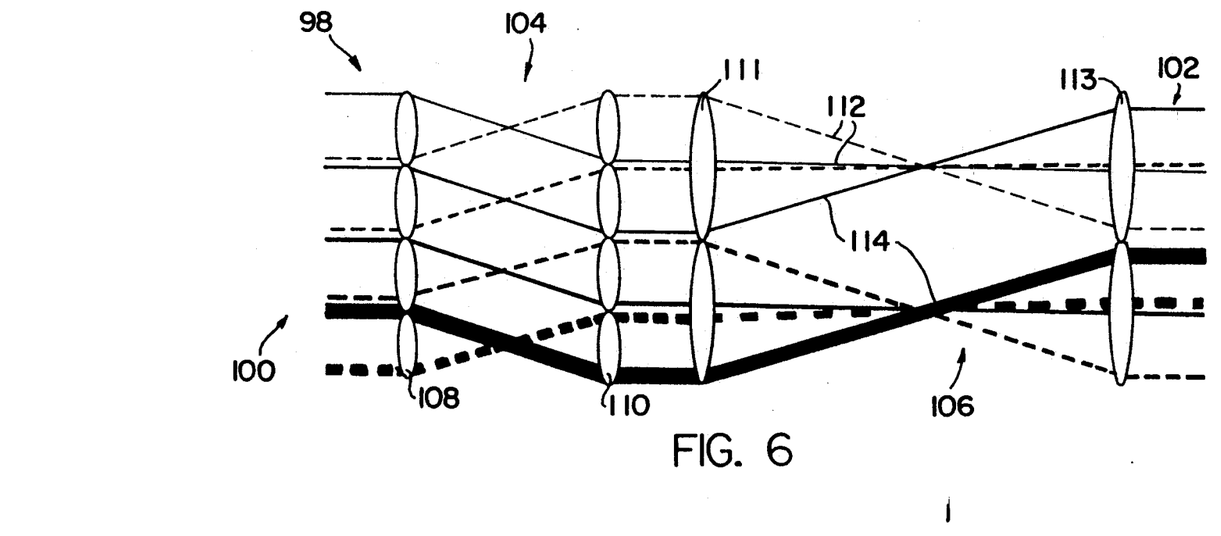
FIG. 6 illustrates an optical system provided according to the present invention having two micro-optic multiplets for mixing an input optical beam.

Referring to FIG. 6, there is shown still another optical system 98 provided according to the present invention capable of mixing the energy distribution of input beam 100 (on the left) to produce a different distribution in the outgoing beam 102 (on the right). The optical system 98 is comprised of MOMs 104 and 106. MOM 104 has MLMs 108 and 110 with the same pitch and same focal length to form a 1 to 1 Keplerian telescope. MOM 106 has MLMs 111 and 113 which also have the same pitch and focal length, with at least the pitch being different from that of MOM 104 to form a second 1 to 1 Keplerian telescope. MOM 106 has MLMs with a greater pitch than those of MOM 104, but the reverse arrangement could also be used. The mixing of the input beam is illustrated graphically in the figure. Line pairs 112, 114 show the intermingling and overlapping of rays from different transverse positions in the input beam to different transverse positions in the outgoing beam.

Arrays of lenslets are arranged in pairs (one in each MLM) to form inverting (Keplerian) telescopes, using several sets with various lenslet sizes. FIG. 1 shows the effect of an inverting a focal telescope with a single subaperature. In FIG. 6, a telescope with four subaperatures precedes one with two subaperatures. Such an arrangement serves to mix the beam by locally inverting sections of it at each lens pair. The number of lenslets in each pair, the number of pairs, and their order is determined to optimize the amount of mixing given permissible size of the system and the focal lengths and apertures of the lenslets.

There are a number of challenges to designing a system as shown in FIG. 6. One drawback is that it have internal foci. In a high power laser system this requirement could cause ionization breakdown of the air surrounding the MLMs. Galilean telescopes are often used to avoid internal foci but they do not invert the beam and, therefore, would not be suitable for this application. Ionization could be avoided in one of two ways; only MLMs of small lenslets could be used so as to reduce the fluence through any one subaperature; or the MLMs of the system could be placed in vacuum.

Secondly, not only does each pair of lenslets invert the intensity profile of its respective subaperature but the phase front is also inverted. Unless a well-collimated beam (i.e. a plane wave) is incident on the system, the output beam will yield a wavefront with high-order phase aberrations. Fixed aberrations of the lenslets themselves would be minimized by balancing geometrical and diffractive lens effects and, if necessary, by using aspheric surfaces.

Figure 7:
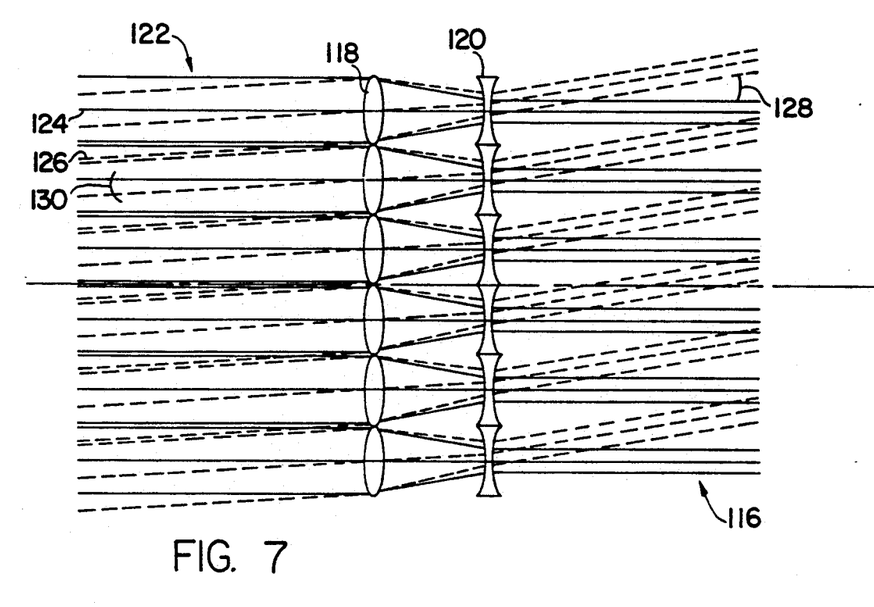
FIG. 7 illustrates a telescope system provided according to the present invention having a pair of micro-lens modules that form an array of Galilean telescopes.

Referring now to FIG. 7, there is illustrated telescope 116 provided according to the present invention that includes a pair of MLMs 118, 120 configured so that the telescope so formed is of the Galilean type. The incoming beam 122 is comprised of solid rays 124 from an on-axis object and dotted rays 126 from an off-axis object. As can be seen, the angle 128 between the on and off axis object rays in the outgoing beam radiation is different from corresponding angle 130 in the incoming radiation by the magnification of the telescope 116.

A convenient condition for good optical quality is that only a single output image is formed, i.e., an off-axis ray entering the first MLM may not strike the adjacent lenslet of the second array. In a particular example, MLM 118 has lenslets of a focal length of 1200 Îm and a diameter of 100 Îm. MLM 120 has the same diameter and a focal length of −400 Îm to form a 3 to 1 magnification telescope. A separation of the two arrays is 800 Îm. With these parameter values, the half angle on the incoming beam that is permitted before the marginal ray strikes the second MLM at an adjacent subaperature is 2.4. This corresponds to an object size at 1000 feet at 88 feet.

In general, a positive and a negative MLM may be combined in an optical system that is not Galilean in configuration. For example, a magnifying glass may be made of such a combination with the parameters arranged to give a virtual image with a magnification greater than one. An example of such an arrangement is:

$f_1 = 2$ mm, $d_1 = 1$ mm
$f_2 = 0.4$ mm, $d_2 = 0.9833$ mm
separation = 16.09 mm This provides magnification of 10× for object at 250 mm Note that $d_2$ is the spacing of the second lens array elements. The lenses need not fully fill this space. Thus the F number of these lenslets is not unreasonable.

Figure 8:
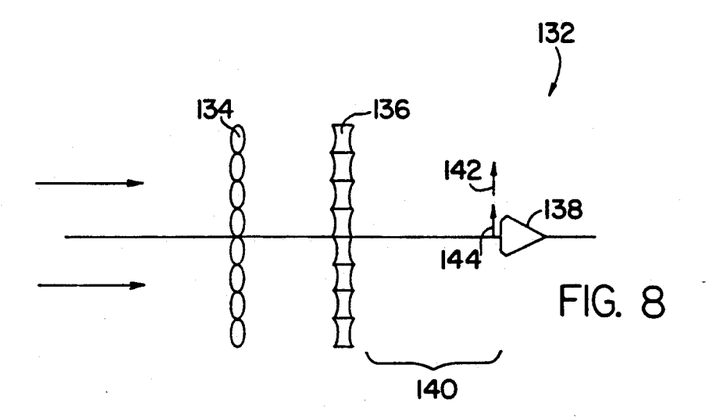
FIG. 8 illustrates several parameters of the telescope system of FIG. 7.

Referring now to FIG. 8, there is shown a second telescope 132 provided according to the present invention corresponding to a light-weight Galilean telescope array or "opera glass". The telescope is comprised of a pair of MLMs 134, 136 constructed according to the specifications of FIG. 7. Incoming radiation strikes a detector (e.g., eye 138) separated from the telescope 132 by a distance indicated at 140, which will be a few centimeters. The condition for good quality image is that the rays representing the first order deflected radiation of a spurious image miss the pupil of the eye as denoted by the small sets of arrows 142 and with arrows 144 striking the pupil. The angular limit between the primary radiation and the first spurious image is $d_1/f_1$ giving a condition on the input angular range for a 3 to 1 magnification of $Q^a d_1 / R^a f_1$.

Figure 9:
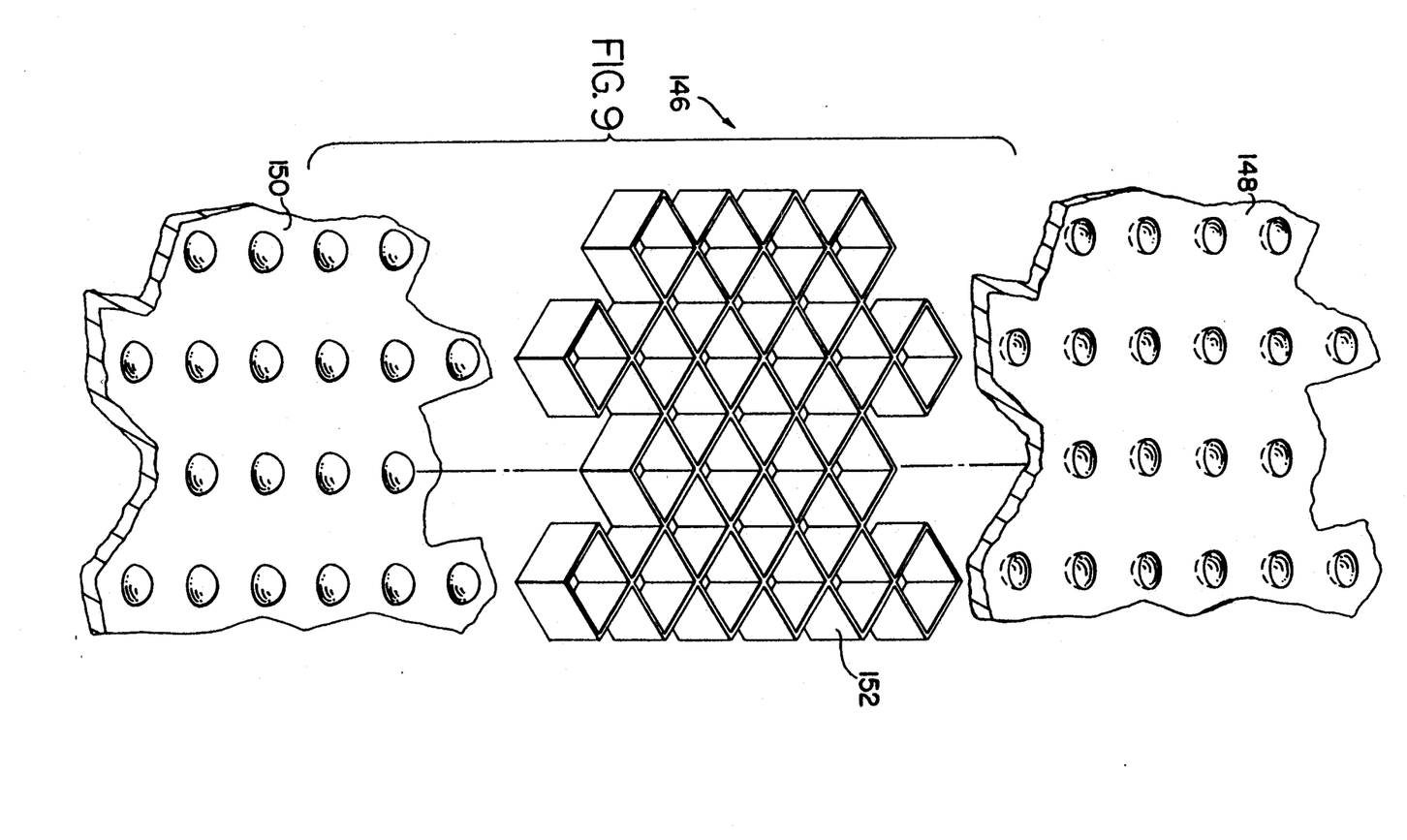
FIG. 9 illustrates in perspective form an embodiment of the telescope system of FIG. 8.

An alternative approach to suppressing spurious images is to block physically the off-axis radiation that would enter an adjacent lenslet in the second array. One version of a Galilean telescope that would perform in this manner is shown in exploded form in FIG. 9. Telescope 146 includes MLMs 148, 150 separated by a honeycomb grid 152 that may be formed by extrusion of an opaque plastic having a thickness corresponding to the desired separation of the MLMs.

Figure 10:
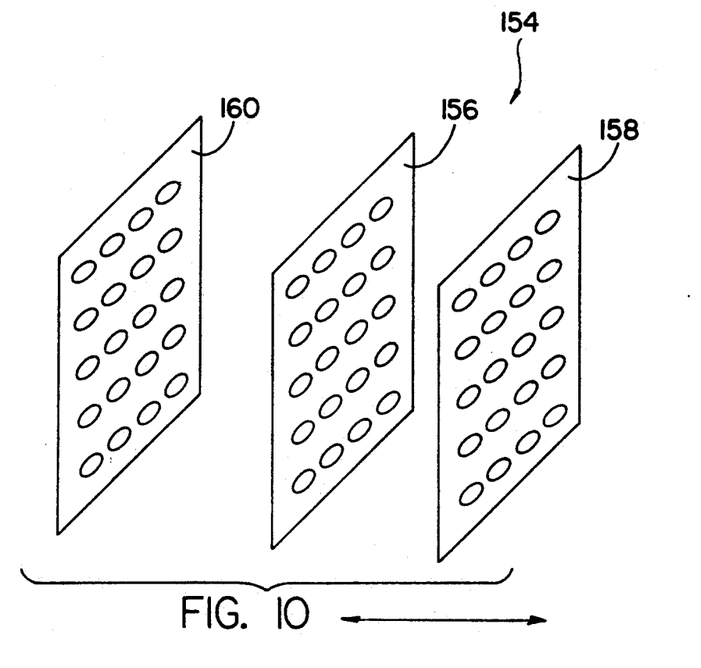
FIG. 10 illustrates a zoom MOM constructed according to the present invention.

Zoom lenses are conventionally made with a triplet of positive, negative and positive lenses, the last two being mounted to move together to change the magnification for a fixed focal plane. A Zoom MOM may be constructed in analogy, with either the first or the last two MLMs being movable. FIG. 10 illustrates a zoom MOM 154 constructed according to the present invention, with an additional MLM 156 inserted between MLMs 158 and 160. Illustratively, MLMs 158 and 160 are positive and MLM 156 is negative. All of the MLMs in the zoom MOM are of the same pitch.

Referring again to equation 11 it is readily appreciated that if $f_1$ is changed, the effective focal length of the zoom MOM is changed. Further, since the image distance is given by $(f_2 * R)/(R-1)$, the image distance does not depend on $f_1$. Thus the zoom MOM is a true zoom system. In practice the focal length of the first MLM may be varied by substituting a pair of MLMs (or a MOM). If a positive - negative pair is chosen, the focal length may be varied by varying the lens spacing. Alternatively, the MLM 156 can be replaced with a field lens. Other zoom configurations can be made by adding additional MLMs or field lenses. For example a telephoto system can be made with two MLMs positioned along a central axis to be moveable relative to one another with a first MLM being an objective such that the effective focal length of the telephoto system is longer than the objective.

In a particular example, a fixed-focus camera having a zoom lens is constructed using a MOM instead of a conventional lens. Parameters of a suitable MOM are:
$d_1 = 1$ mm, $f_1 = 2$ mm
$d_2 = 1.025$ mm, $f_2 = 0.4$ mm
$d_3 = 0.8$ mm, $f_3 = 2$ mm
with lens 1 5.6 mm in front of lens 3 and lens 2 at 3.9 mm in front the effective focal length is 55 mm and image position 18.5 mm behind lens 3. With lens 1 at 5.0 mm and lens 2 at 3.25 mm the effective focal length is 27.5 mm with the image at 18.5 mm.

Figure 11:
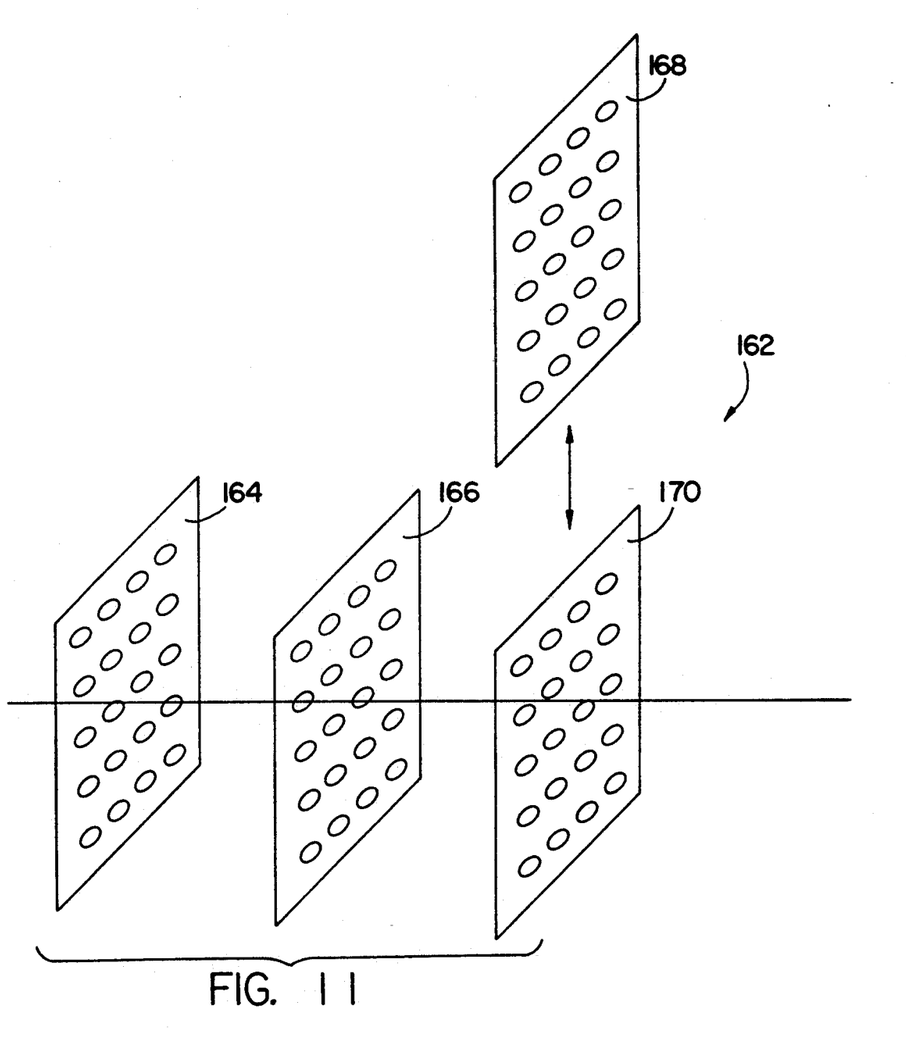
FIG. 11 illustrates a first alternative to the zoom MOM of FIG. 10.
Figure 12:
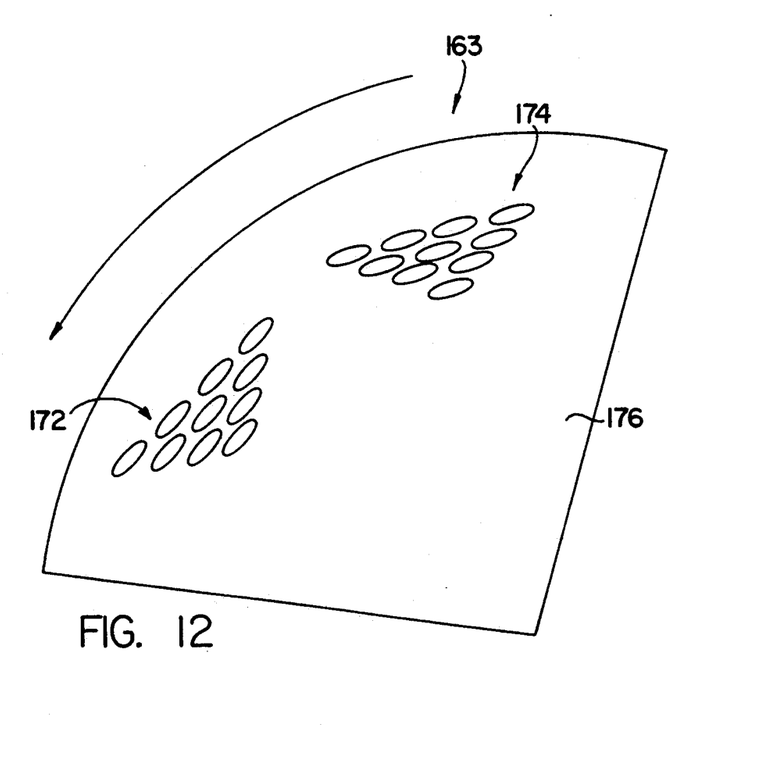
FIG. 12 illustrates a second alternative to the zoom MOM of FIG. 10.

Referring to FIGS. 11 and 12, there is respectively illustrated first and second alternative zoom MOMs 162, 163 in which two or more fixed magnifications are available. In the embodiment of FIG. 11, first and second MLMs 164, 166 are the same as before with respect to FIG. 10. A third MLM selectable between MLM 168 or 170. These MLMs have different pitch as compared to one another, so that the quantity R in equation 4 will be different when one or the other is present. Thus, the magnification is easily changed without the need for complex hardware required to provide the differential motion of conventional zoom lenses. The embodiment in FIG. 11 uses a linear translation. An alternative embodiment partially shown in FIG. 12 has MLMs 172 and 174 affixed to support member 176. Either of these rotated into alignment to form the zoom MOM.

It should be understood that the present invention is not limited to the particular embodiments shown and described herein, but that various changes and modifications may be made without departing from the spirit and scope of this novel concept as defined by the following claims.

We claim:

1. An optical system for processing incident radiation emitted from a source, said system comprising:

a first lenslet array comprising a first microlens module (MLM) and having a first focal length, a first pitch, and a first lens diameter, positioned at a first longitudinal distance along an optic axis to intercept said incident radiation; and a second lenslet array comprising a second MLM and having a second focal length, second pitch, and a second lens diameter, positioned at a second longitudinal distance along said optic axis to intercept radiation emerging from said first lenslet array, said second lenslet array being separated along said optic axis from said first lenslet array by a predetermined amount such that said said incident radiation is focused by the combined action of a plurality of pairs of corresponding lenslets from said first and second lenslet arrays to an overlap image in an overlap plane transverse to said optic axis and to a set of off-axis secondary images located at a set of transverse positions displaced from said optic axis, said first and second MLMs forms an array of Keplerian telescopes.

2. An optical system for processing incident radiation emitted from a source, said system comprising;

a first microlens module (MLM) comprising positive lenslets and having a first focal length, a first pitch, and a first lens diameter, positioned at a first longitudinal distance along an optic axis to intercept said incident radiation;

a second MLM comprising negative lenslets and having a second focal length, second pitch, and a second lens diameter, positioned at a second longitudinal distance along said optic axis to intercept radiation emerging from said first lenslet array, said second lenslet array being separated along said optic axis from said first lenslet array by a predetermined amount such that said incident radiation is focused by the combined action of a plurality of pairs of corresponding lenslets from said first and second lenslet arrays to an overlap image in an overlap plane transverse to said optic axis and to a set of off-axis secondary images located at a set of transverse positions displaced from said optic axis; and a positive lens serially configured with said first and second MLMs such that said second MLM is spaced between said first MLM and said positive lens to form a zoom optical system.

3. An optical system for processing incident radiation emitted from a source, said system comprising:
- a first microlens module (MLM) having a first focal length, a first pitch, and a first lens diameter, positioned at a first longitudinal distance along an optic axis to intercept said incident radiation;
- a second MLM and having a second focal length, second pitch, and a second lens diameter, positioned at a second longitudinal distance along said optic axis to intercept radiation emerging from said first lenslet array, said second lenslet array being separated along said optic axis from said first lenslet array by a predetermined amount such that said incident radiation is focused by the combined action of a plurality of pairs of corresponding lenslets from said first and second lenslet arrays to an overlap image in an overlap plane transverse to said optic axis and to a set of off-axis secondary images located at a set of transverse positions displaced from said optic axis; and
- a third MLM serially configured with said first and second MLMs to form a zoom optical system, said third MLM comprised of negative lenslets, said first and second MLMs comprised of positive lenslets, said second and third MLMs being moveable relative to said first MLM, thereby forming a zoom micro-optic multiplet (MOM).

4. An optical system for processing incident radiation emitted from a source, said system comprising;
- a first microlens module (MLM) comprising positive lenslets and having a first focal length, a first pitch, and a first lens diameter, positioned at a first longitudinal distance along an optic axis to intercept said incident radiation;
- a second MLM comprising negative lenslets and having a second focal length, second pitch, and a second lens diameter, positioned at a second longitudinal distance along said optic axis to intercept radiation emerging from said first lenslet array, said second lenslet array being separated along said optic axis from said first lenslet array by a predetermined amount such that said incident radiation is focused by the combined action of a plurality of pairs of corresponding lenslets from said first and second lenslet arrays to an overlap image in an overlap plane transverse to said optic axis and to a set of off-axis secondary images located at a set of transverse positions displaced from said optic axis; and
- a third MLM, said first, second and third MLMs forming a telephoto optical system.

* * * * *

UNITED STATES PATENT AND TRADEMARK OFFICE
CERTIFICATE OF CORRECTION

PATENT NO. : 5,270,859  
DATED : December 14, 1993  
INVENTOR(S) : Allan Wirth et al Page 1 of 2

It is certified that error appears in the above-indentified patent and that said Letters Patent is hereby corrected as shown below:

Column 1, line 14     "07/8267,794" should read --07/827,794--

Column 3, line 30     "1/C = Q/R (1/S + 1/Feft" should read

--1/C = Q/R (1/S + 1/Feff--

Column 4, line 13     after "a single" insert --image of the object via the superposition of the images from each--

Column 4, line 62     "Cs" should read --$\tilde{Cs}$--

Column 5, line 5     "S=s should read --S=$\tilde{s}$--

Column 6, line 51     "$f_1 = f_2$/and d1 =$d_2$" should read

--$f_1 = f_2$ and $d_1 = d_2$--

Column 7, line 19     "$C_s$" should read --$\tilde{Cs}$--

Column 8, lines 29 and 30     "seoond eMLMs" should read --second MLMs--

Column 9, Equation 21     "Blur spot= $\lambda$*f# of lenslet= $\lambda$*d2" should read --Blur spot= $\lambda$*f# of lenslet= $\lambda$*C/$d_2$--

UNITED STATES PATENT AND TRADEMARK OFFICE
CERTIFICATE OF CORRECTION

PATENT NO. : 5,270,859
DATED : December 14, 1993
INVENTOR(S) : Allan Wirth et al It is certified that error appears in the above-indentified patent and that said Letters Patent is hereby corrected as shown below:

Column 12, line 38     delete second occurrence of "said"
    Claim 1

Column 12, line 45     "forms" should read --form--
    Claim 1

Signed and Sealed this

Thirteenth Day of September, 1994

*Attest:*

BRUCE LEHMAN

*Attesting Officer*     *Commissioner of Patents and Trademarks*